(12) United States Patent
Yao

(10) Patent No.: US 7,551,403 B2
(45) Date of Patent: Jun. 23, 2009

(54) HSA WITH AIR TURBULENCE PREVENTING STRUCTURE FOR HGA, DISK DRIVE UNIT WITH THE SAME, AND MANUFACTURING METHOD THEREOF

(75) Inventor: MingGao Yao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 221 days.

(21) Appl. No.: 11/282,696

(22) Filed: Nov. 21, 2005

(65) Prior Publication Data
US 2007/0115593 A1      May 24, 2007

(51) Int. Cl.
*G11B 5/55*     (2006.01)
(52) U.S. Cl. .................................. 360/265.9
(58) Field of Classification Search ........... None
See application file for complete search history.

(56) References Cited

U.S. PATENT DOCUMENTS

| | | | |
|---|---|---|---|
| 6,570,742 B2 | 5/2003 | Korkowski et al. | |
| 6,765,764 B1 * | 7/2004 | Misso et al. | 360/266.1 |
| 7,059,868 B1 * | 6/2006 | Yan | 439/67 |
| 2002/0154449 A1 * | 10/2002 | Raphael et al. | 360/266 |
| 2004/0012893 A1 * | 1/2004 | Tadepalli | 360/266 |
| 2004/0066583 A1 * | 4/2004 | MacLeod | 360/265.9 |
| 2005/0157430 A1 * | 7/2005 | Korkowski et al. | 360/265.9 |

* cited by examiner

*Primary Examiner*—Mark Blouin
(74) *Attorney, Agent, or Firm*—Nixon & Vanderhye, P.C.

(57) ABSTRACT

A HSA of the present invention includes a voice coil; an E-block connected to the voice coil, which including at least one actuator arms; at least one HGAs, wherein each HGA is swaged on a tip of the respective actuator arm and includes a suspension having a flexure for supporting a slider thereon; and at least one support block formed on each actuator arm which having a supporting portion to support a tail end of the flexure so as to reduce or delete a displacement of the flexure. The invention also discloses a manufacturing method thereof and a disk drive unit with such an HSA.

10 Claims, 11 Drawing Sheets

HSA WITH AIR TURBULENCE PREVENTING STRUCTURE FOR HGA, DISK DRIVE UNIT WITH THE SAME, AND MANUFACTURING METHOD THEREOF

FIELD OF THE INVENTION

The present invention relates to a disk drive unit, and in particular to a head stack assembly (HSA) having a structure of preventing air turbulence for a head gimbal assembly (HGA) of a disk drive unit and preventing sliders thereon from off-track.

BACKGROUND OF THE INVENTION

Disk drives are information storage devices that use magnetic media to store data. The structure of a conventional disk drive is illustrated in FIG. 1. The disk drive comprises a housing 801 containing a set of magnetic disks 802 each having a surface on which a magnetic coating is provided for forming a plurality of concentric tracks (not shown). The disks 802 are mounted on a spindle motor 803 that selectively spins the disks 802. An actuator arm 804 is arranged in the housing 801 and is controlled by a voice-coil motor (VCM) 807 to drive a HGA 805 to fly above the disk 802, whereby a slider (or head) 806 carried by the HGA 805 is movable across the surface of the disk 802 from track to track for reading data from or writing data to the disk 802. In operation, a lift force is generated by aerodynamic interaction between the slider 806 and the spinning disk 802. The lift force is opposed by equal and opposite spring forces applied by a suspension of the HGA 805 such that a predetermined flying height above the surface of the spinning disk 802 is maintained over a full radial stroke of the actuator arm 804.

With the quickly increasing of the disk drive capacity and the improvement of the head seeking and settle times, the disk RPM (round per minute) becomes higher and higher for example 7,200, 10,000 and 15,000 RPM. With such a high rotation rate of the disk, an air flow created by rotation of the disk along the actuator arm and the suspension of the HGA to an air bearing surface (ABS) of the slider becomes faster and faster, this will create a big air turbulence due to interference of the air flow with the actuator arm and the suspension of the HGA, thereby causing vibration of the HGA. This will force the slider loaded thereon to be off-track and thus cause reading/writing errors of the disk drive.

In prior designs, since a structure in the actuator arm to restrict air flow is very small and its thickness has a limitation, it is easy for the air flow to go through a space between the actual arm/suspension and the disk surface to the ABS of the slider. This will still cause an air turbulence and vibration of the actuator arm/suspension.

Since the actuator arm and a load beam of the suspension are made by rigid material, a flexure of the suspension is easier to vibrate especially in a tail area thereof due to the air turbulence. Furthermore, since it is flexible and there is no limited support in its tail area, the vibration of the flexure in the tail area is more serious, which will affect the flying of the slider (or head) and cause an air turbulence and the slider off-track.

To solve the above-mentioned problems, U.S. Pat. No. 6,570,742 B2 teaches using a shield along a flow path to a leading edge of the slider to prevent the actuator arm and the HGA from flow induced vibration and excitation. Referring to FIGS. 2a and 2b, which illustrates the details of the U.S. Pat. No. 6,570,742 B2, an actuator arm 78 controls a HGA 76 and then a slider 84 flying above a disk 101. When the disk 101 is rotated by a spindle motor (not labeled), an air flow 94 is created, which flows around a surface of the disk 101 and is restricted by the actuator arm 78 and the HGA 76. The shield includes a finger 112 extending from a side edge (face to the air flow stream) of a tip 77 of the actuator arm 78. The finger 112 protrudes beyond sides of the actuator arm 78 and the HGA 76 to form a channel boundary to direct the turbulent air flow away from the HGA 76. Hence, a turbulent area 100 is shifted away from the HGA 76. That protects the actuator arm 78 and the HGA 76 from excitation and vibration, reduces the flying turbulence of the slider, and then reduces a possibility of the slider off-track and reading/writing errors of the disk drive. However, the shield restricting the air flow and changing the turbulent flow region will be easier to cause the slider vibration since the restrict force to the actuator arm is bigger. This will be easier to cause the slider vibration and the flexure vibration, especially in the tail area of the flexure, which will largely affect the slider flying and cause the slider to be off-track.

Referring to FIG. 3a, which shows a windage measurement data for the prior design, two peaks 301 at 10-14 kHz region illustrate a slider off-track displacement when the slider flying on the 7,200 RPM disk drive; in corresponding to FIG. 3b, two peaks 302 at 10-14 kHz region illustrate an air turbulence effect on the tail area of the flexure, which causes a flexure displacement in its tail area and thus the slider off-track displacement.

Thus, it is desired to provide a HSA with an air turbulence preventing structure for a HGA of a disk drive unit that can prevent sliders thereon from air flow turbulence induced vibration and excitation.

SUMMARY OF THE INVENTION

A primary aspect of the present invention is to provide a HSA with an air turbulence preventing structure for a HGA of a disk drive unit, which can prevent sliders thereon from vibration and off-track due to the air turbulence.

A second aspect of the present invention is to provide a manufacturing method of a HSA with an air turbulence preventing structure for a HGA of a disk drive unit, which can prevent sliders thereon from vibration and off-track due to the air turbulence.

A third aspect of the present invention is to provide a disk drive unit having a HSA with an air turbulence preventing structure for a HGA of a disk drive unit, which can prevent sliders thereon from vibration and off-track due to the air turbulence.

To achieve the above-mentioned aspects, in accordance with the present invention, a HSA comprises a voice coil; an E-block connected to the voice coil, which comprising at least one actuator arms; and at least one HGAs, wherein each HGA is swaged on a tip of the respective actuator arm and comprises a suspension having a flexure for supporting a slider thereon; at least one support block formed on each actuator arm which having a supporting portion to support a tail end of the flexure so as to reduce or delete a displacement of the flexure. As an embodiment, the support block is provided on a tip of each actuator arm, and the support portion is positioned in a side portion thereof. The support block is a step support having a top surface, a bottom surface, the supporting portion protruding from at least one of the top and bottom surfaces, and a swage hole for swaging the HGA. In another embodiment, the supporting portion has a support surface to support the tail end of the flexure.

A disk drive unit according to the present invention comprises a set of disks; a spindle motor to spin the disks, a HSA and a VCM to drive the HSA. The HSA comprises a voice coil; an E-block connected to the voice coil, which comprising at least one actuator arms; and at least one HGAs, wherein each HGA is swaged on a tip of the respective actuator arm and comprises a suspension having a flexure for supporting a slider thereon; and at least one support block formed on each actuator arm which having a supporting portion to support a tail end of the flexure so as to reduce or delete a displacement of the flexure.

A method of forming a HSA, which comprising the steps of: forming a voice coil; forming an E-block having at least one actuator arms and connected it to the voice coil, which comprising; and forming at least one HGAs each of which comprising a suspension having a flexure for supporting a slider thereon and swaging each HGA on a tip of the respective actuator arm; wherein forming the E-block having at least one actuator arms comprises the step of forming at least one support block each having a support portion on each actuator arm to support a tail end of the flexure.

In comparison with the conventional devices, the actuator arm of the HSA in accordance with the present invention forms a support block, such as a step support thereon having a support portion to support the tail end of the flexure for preventing the flexure tail from vibration. Hence, this can prevent the slider from off-track displacement and thus reduce the position error signals of the slider. Preferably, the support portion has a support surface, not a support point to support the tail end of the flexure so as to make the flexure more stable and free from vibration.

The present invention will become more obvious from the following description when taken in connection with the accompanying drawings, which show, for purposes of illustration only, preferred embodiments in accordance with the present invention. In the drawings:

BRIEF DESCRIPTION OF THE DRAWINGS

FIG. 5a illustrates a detailed structure of a HGA of the HSA in FIG. 4a;

FIG. 5b illustrates a detailed structure of an actuator arm of the HSA in FIG. 4a;

FIG. 6a is a side view of the HSA in FIG. 4a;

FIG. 6b illustrates a detailed structure of an end area of the HSA in FIG. 4a.

DETAILED DESCRIPTION OF THE PREFERRED EMBODIMENTS

Figure 1:
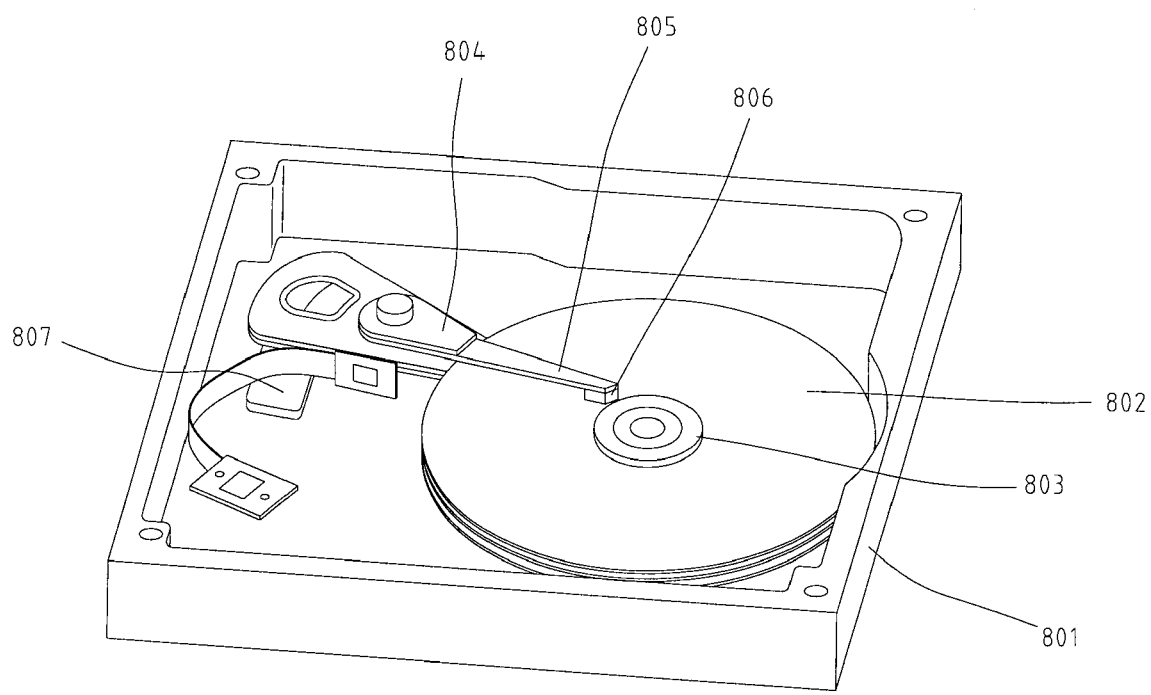
FIG. 1 illustrates a conventional disk drive unit.
Figures 2A, 2B:
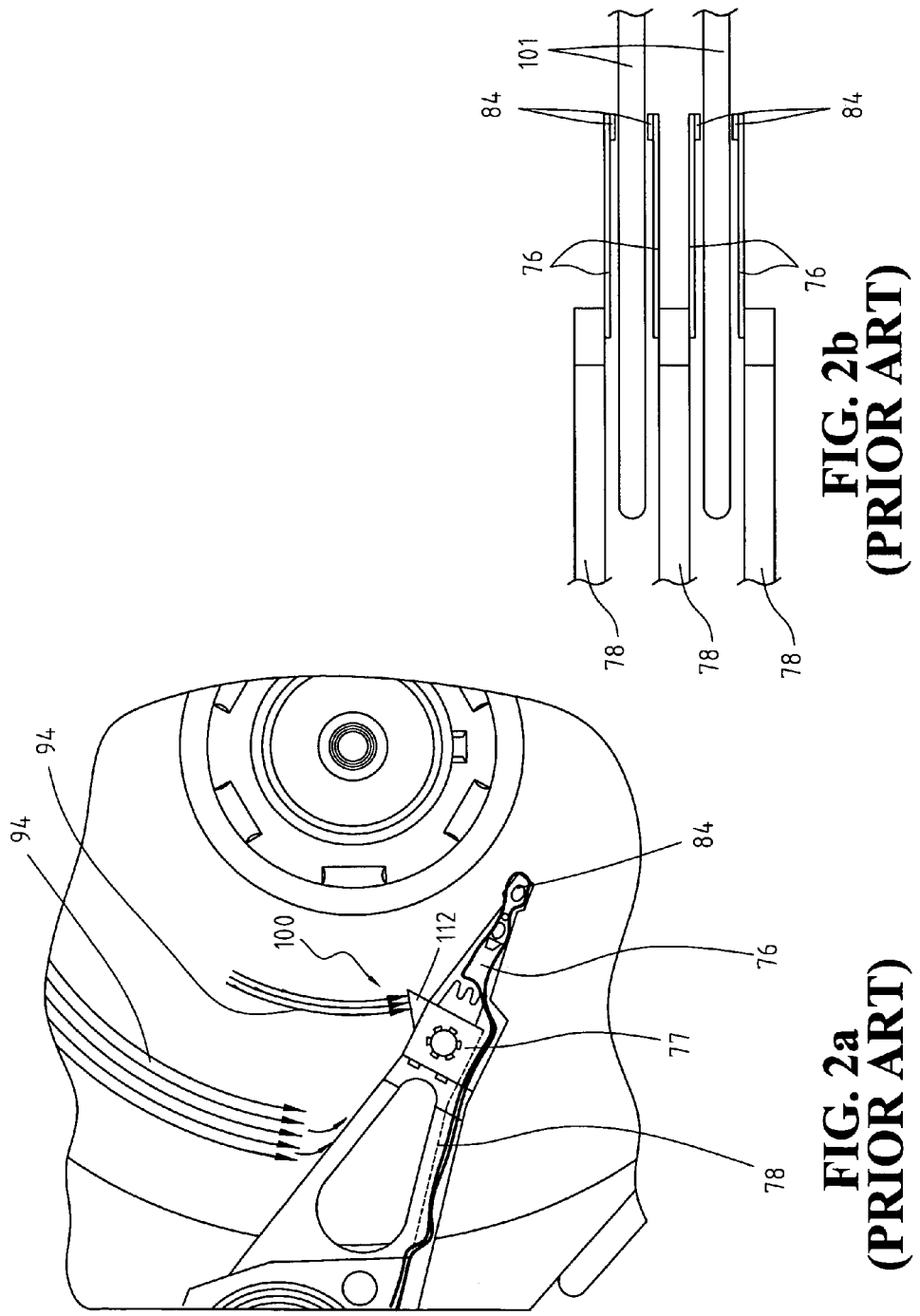
FIG. 2a is a detailed illustration of a conventional HSA including a shield along an air flow path to a leading edge of a slider.
FIG. 2b is a side view of a HGA of the conventional HSA loading on a disk drive system and sliders flying on rotation disks.
Figure 3A:
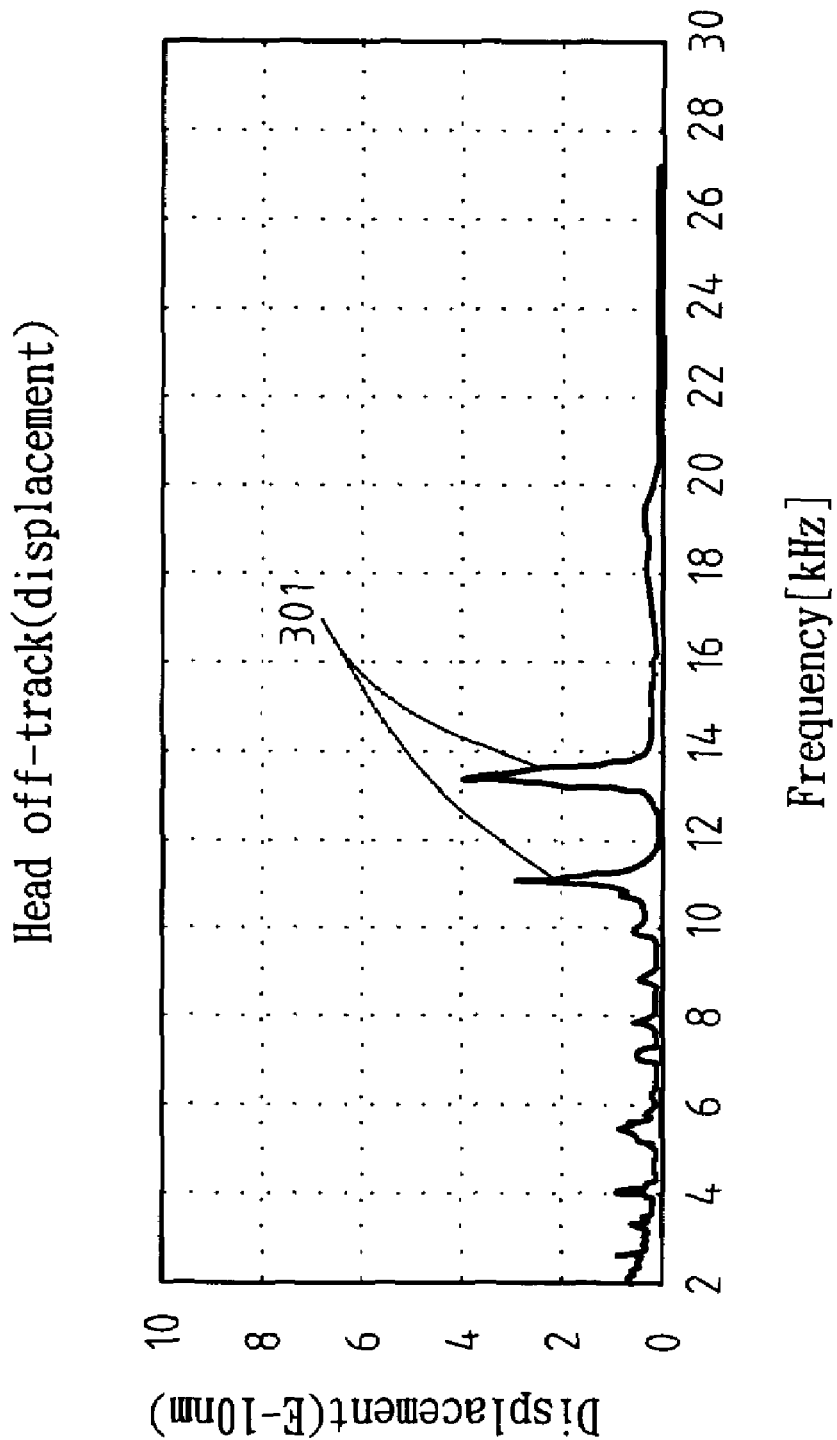
FIGS. 3a and 3b show a windage measurement data of a slider off-track displacement and a flexure tail displacement, respectively, for the prior art.
Figure 3B:
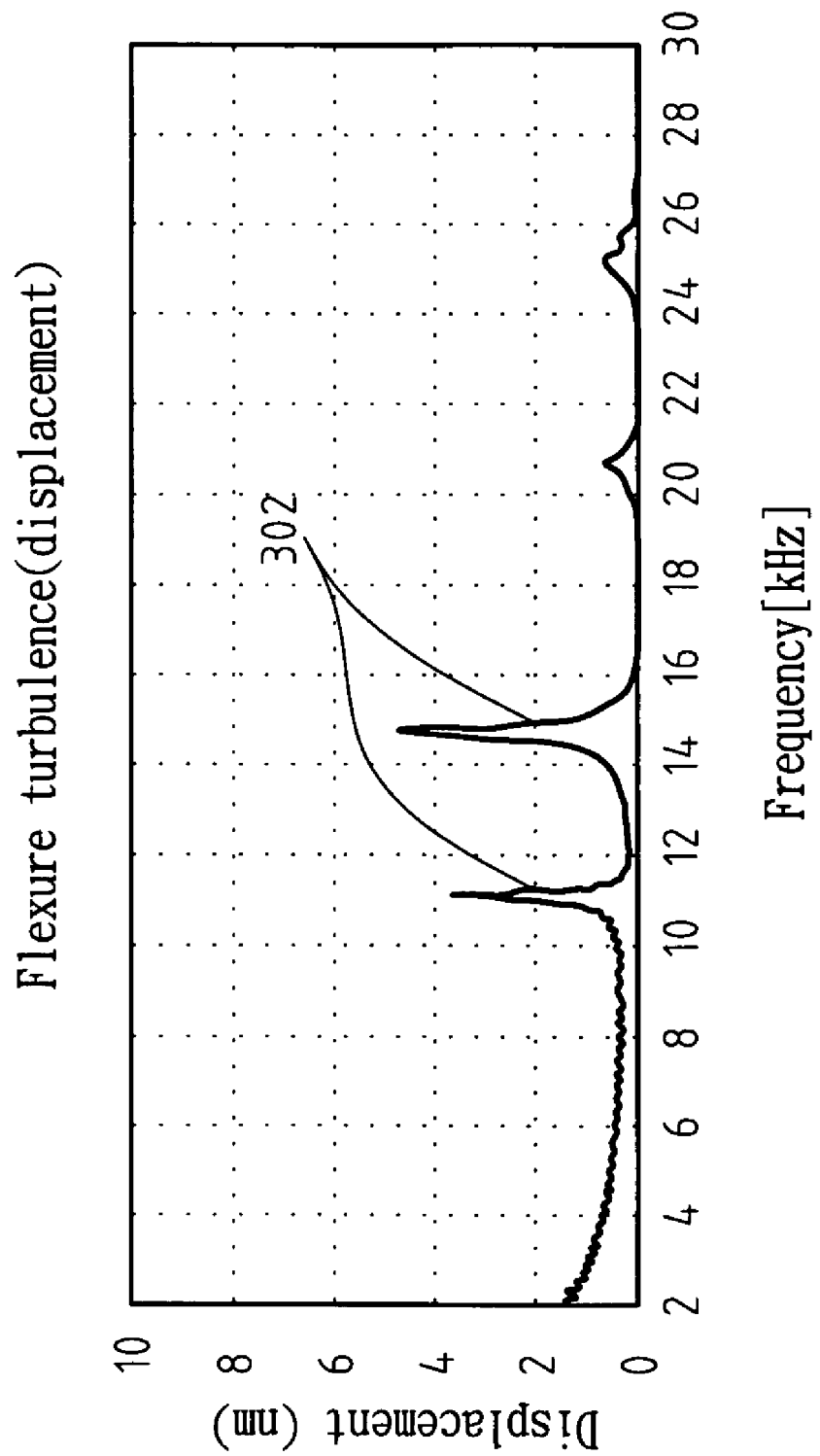

Various preferred embodiments of the instant invention will now be described with reference to the figures, wherein like reference numerals designate similar parts throughout the various views. As indicated above, the instant invention is designed to a head stack assembly (HSA) having an air turbulence preventing structure for HGA which can prevent the sliders thereon from off-track displacement when flying above the rotating disks and thus reduce the position error signals of the slider. Specifically, the present invention is provide at least one support block, such as a step support with a support portion on an actuator arm of the HSA to support a tail end of each flexure of the HGA, thereby preventing the tail end of the flexure from turbulent flow induced vibration and displacement.

Figure 4A:
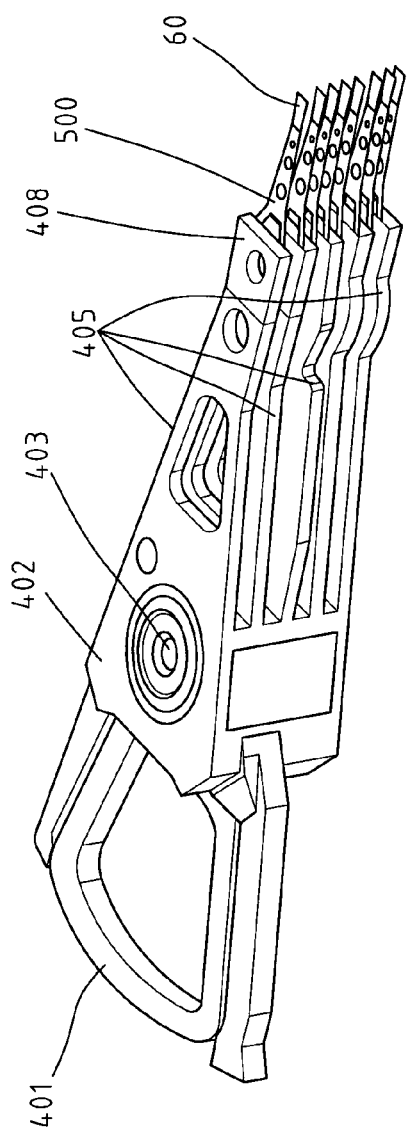
FIG. 4a is a perspective view of a HSA in accordance with an embodiment of the present invention.
Figure 4B:
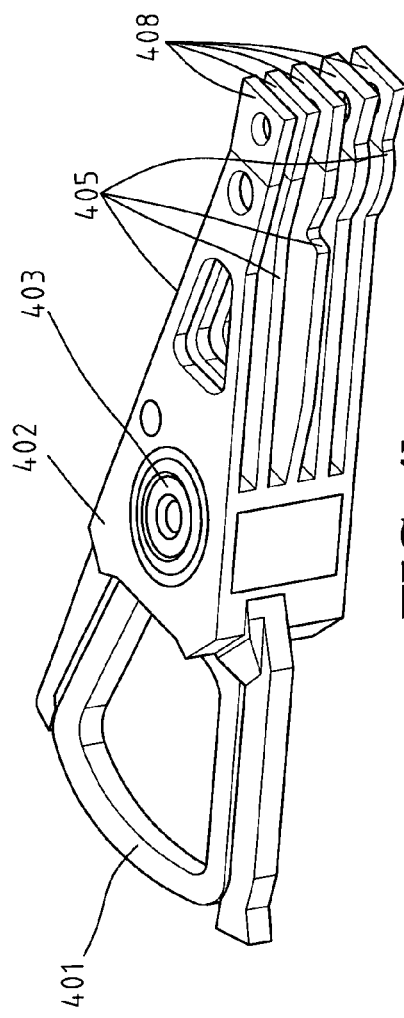
FIG. 4b is a perspective view of the HSA of the present invention after removing HGAs from an E-block of the HSA.
Figure 8:
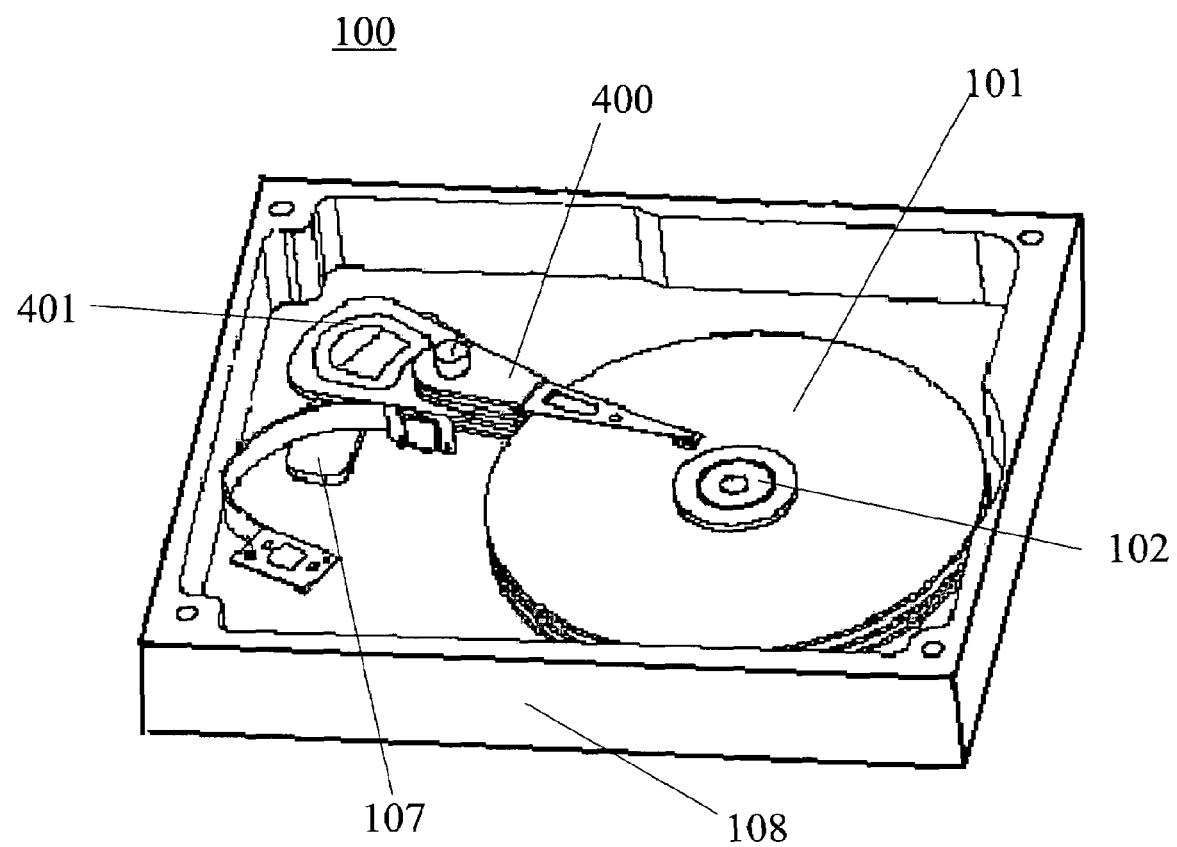
FIG. 8 illustrates a disk drive unit with a HSA in FIG. 4a according to an embodiment of the invention.

Several example embodiments of the HSA of the invention will now be described. Referring to FIGS. 4a and 4b, a HSA constructed in accordance with the present invention, generally designated with reference numeral 400, comprises a voice coil 401, an E-block 402 having a bearing 403 received in a bearing channel (not labeled) thereof and a plurality of actuator arms 405 each having a cantilevered length extending to a cantilevered end of the actuator arm 405, and a plurality of head gimbal assemblies (HGAs) 500 each swaged on a tip 408 of each actuator arm 405. Referring to FIGS. 4a, 4b and 8, the voice coil 401 is supported for operation in a back iron assembly (not labeled) to form a VCM 107 for driving the HSA 400 and then sliders 60 thereon to fly on disks 101 in a disk drive unit 100. The bearing 403 pivotably connects the HSA 400 to a housing 108 of the disk drive unit 100. The sliders 60 are respectively supported by the corresponding HGAs 500 relative to surfaces of the disks 101 for reading or writing operation.

Figure 5A:
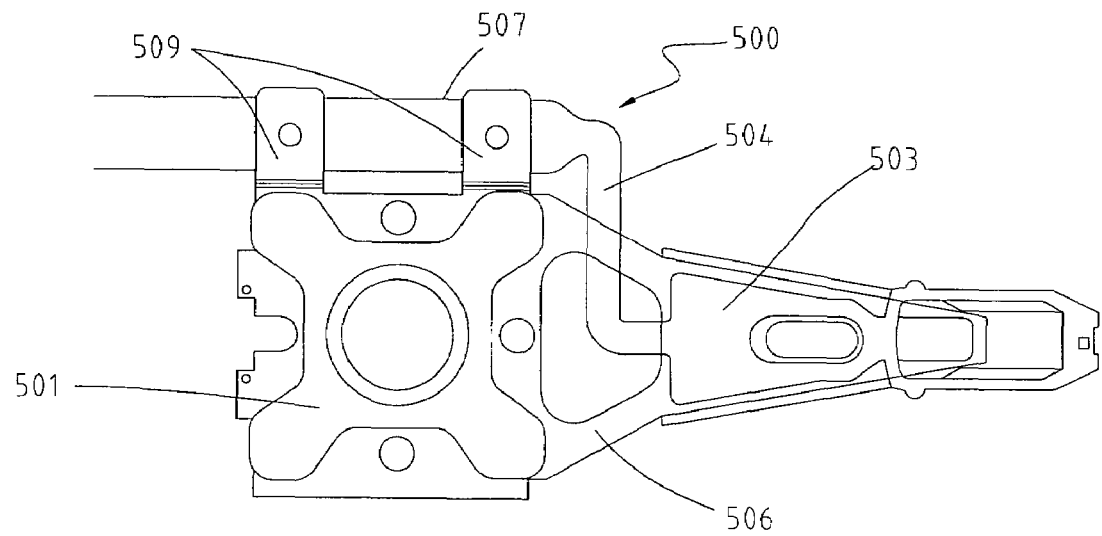
Figure 5B:
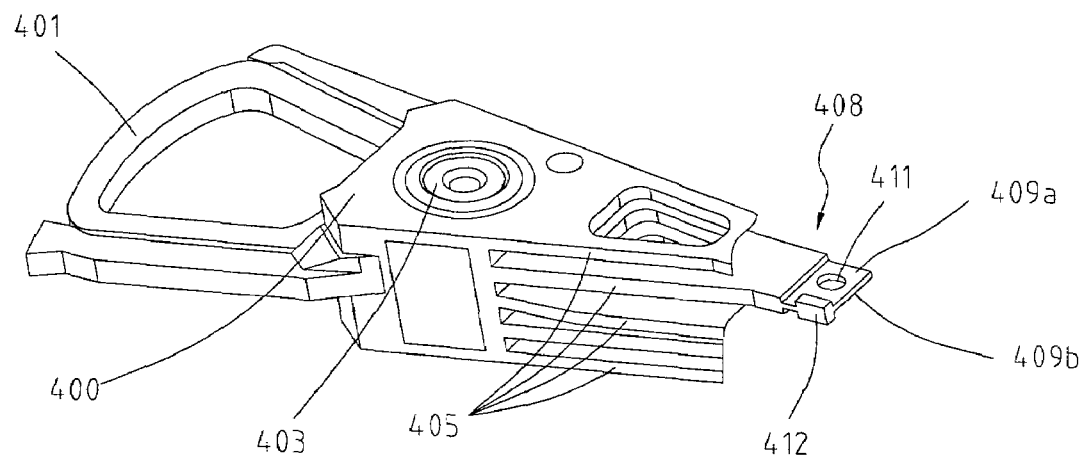

Referring to FIG. 5a, which shows a detailed structure of a HGA according to an embodiment of the invention, the HGA 500 comprises a suspension having a base plate 501, a load beam 503, a flexure 504 and a hinge 506 which are assembled together. The hinge 506 has two flexure holders 509 for supporting a tail end 507 of the flexure 504. When the HGA 500 is swaged to the tip 408 of the actuator arm 405 (see FIG. 4b), the base plate 501 is laminated on a surface of the tip 408 of the actuator arm 405, and the two flexure holders 509 may hang the tail end 507 of the flexure 504. Referring to FIG. 5b, a detailed structure of an actuator arm 405 of the HSA 400 in FIG. 4b is shown in accordance with the present invention. Specifically, the actuator arm 405 has the tip 408 which comprises a step support (not labeled) having a top step surface 409a, a bottom step surface 409b, a side support plate 412 for supporting the tail end 507 of the flexure 504, and a swage hole 411 for swaging the HGA 500 thereon. In comparison with the prior art, the tip 408 of the actuator arm 405 in accordance with the present invention has a step support, especially the side support plate 412 to support the tail end 507 of the flexure 504, which is very different from a flat surface in the tip of the conventional actuator arm.

Figure 6A:
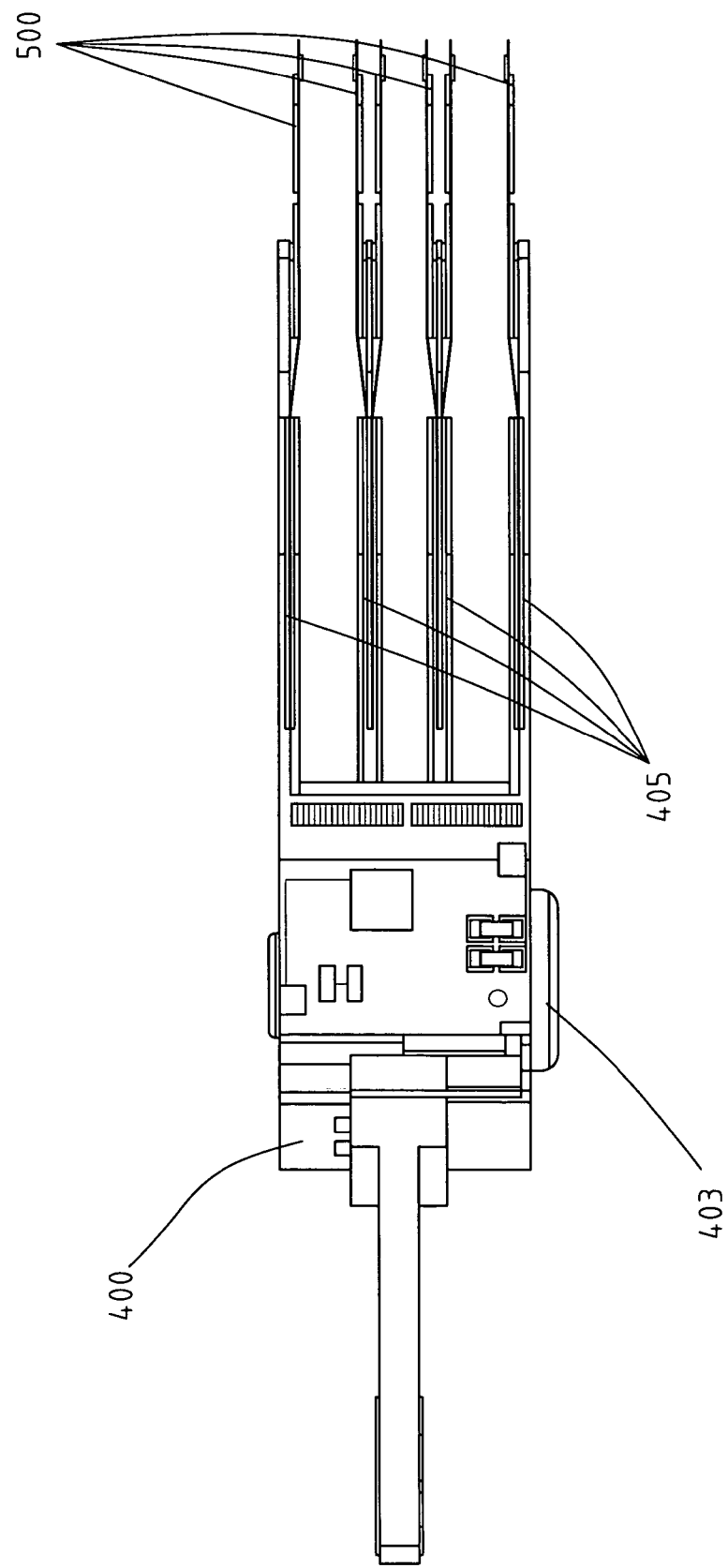
Figure 6B:
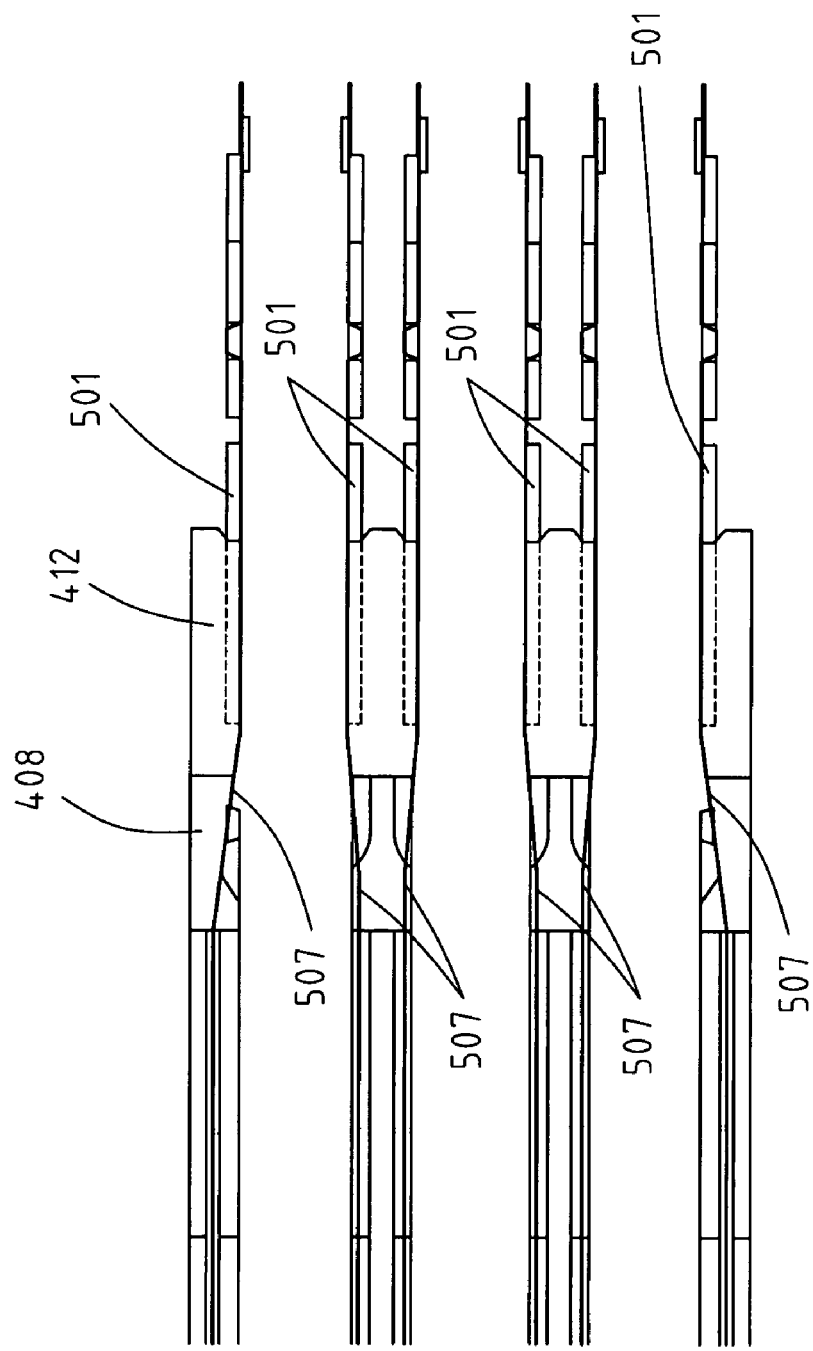

Also referring to FIGS. 6a and 6b, which illustrate the structure of the actuator arms 405 coupled with the HGAs 500, the base plate 501 of each HGA 500 is swaged to the step surface 409a or 409b of the tip 408 of each actuator arm 405, and the side support plate 412 of each actuator arm 405 supports the tail end 507 of each flexure 504, thereby preventing the tail end 507 of the flexure 504 from turbulent flow induced vibration and displacement. Hence, this can prevent the slider 60 (see FIG. 4*a*) from off-track displacement and thus reduce the position error signals of the slider. In an embodiment of the invention, the side support plate 412 is cuboid-shaped and having a support surface to support the tail end 507 so that a large contact area between the side support plate 412 and the tail end 507 can be attained, as shown in FIG. 6*b*. The large contact area between the side support plate 412 and the tail end 507 may make the support of the side support plate 412 to the tail end 507 more stable and thus an off-track preventing function may be better.

Understandably, the side support plate 412 is not limited to a shape in FIG 5*b*, any suitable shape for supporting the tail end 507 may be utilized as a shape of the side support plate 412. In the invention, the side support plate 412 may be more than one for attaining a more stable support and a better off-track preventing function.

Figure 7A:
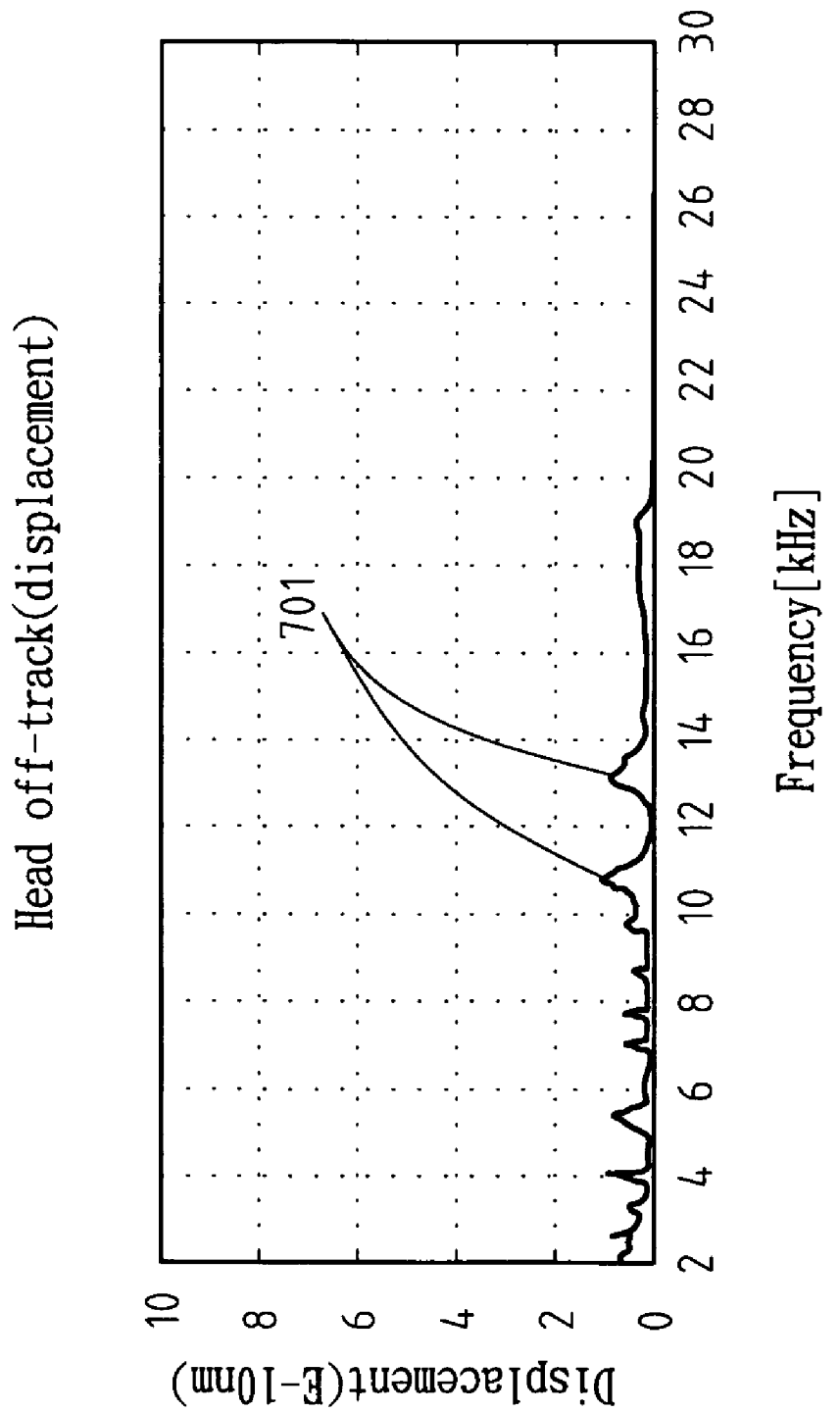
FIGS. 7a and 7b show a windage measurement data of a slider off-track displacement and a flexure tail displacement, respectively, for the present invention.
Figure 7B:
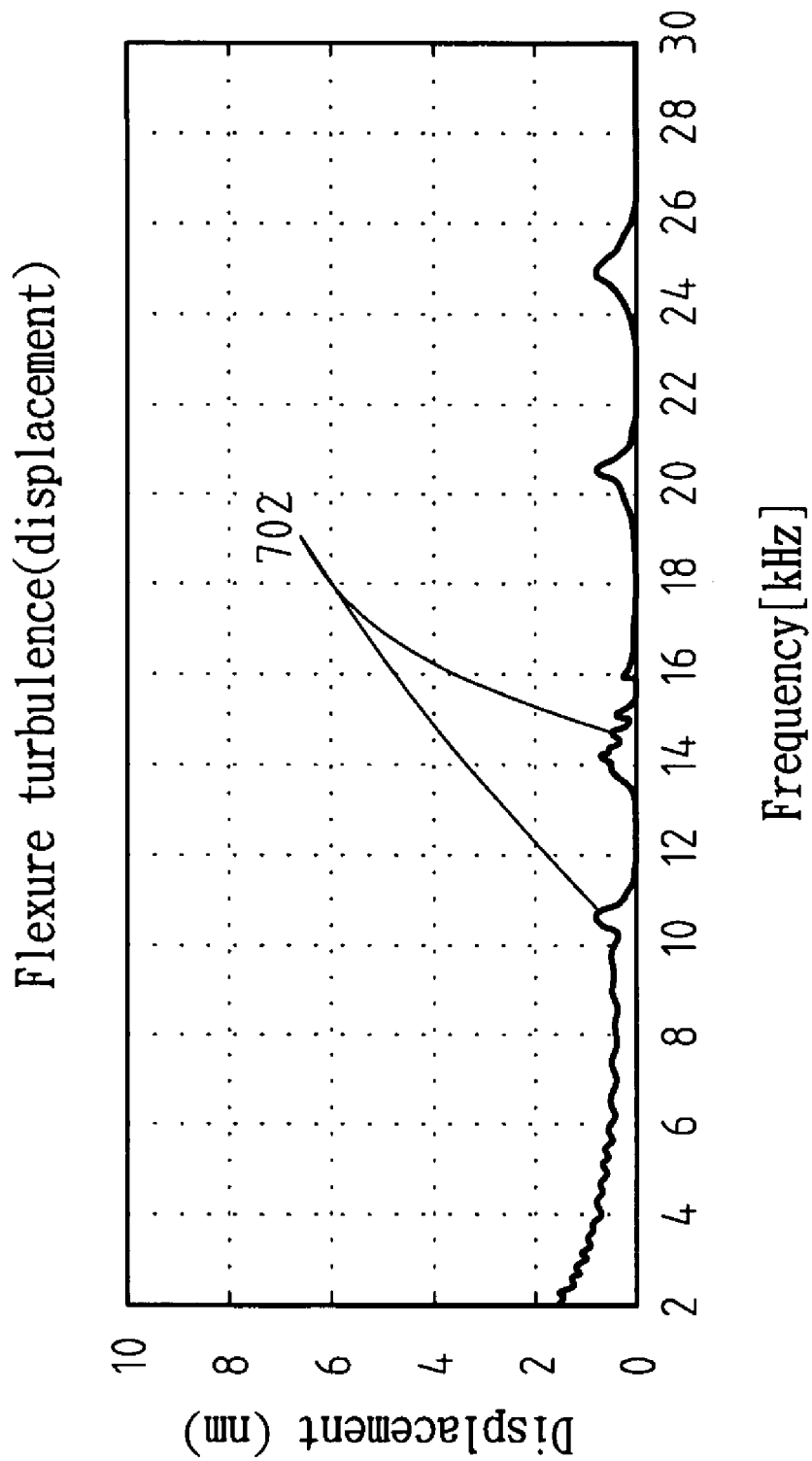

Referring to FIG. 7*a*, which shows a windage measurement data for the HSA 400 of the present invention, two peaks 701 at 10-14 kHz region illustrate a relative smaller slider off-track displacement when the slider 60 flying on a 7,200 RPM disk drive; in corresponding to FIG. 7*b*, two peaks 702 at 10-14 kHz region illustrate air turbulence effect on the tail end 507 of the flexure 504 (see FIG. 5*a*), which causes a relative smaller flexure displacement in its tail end area and thus a relative smaller slider off-track displacement, as compared with the prior design. In a word, the HSA of the present invention has a great improvement for preventing the slider from off-track displacement.

In the present invention, the E-block 402 may comprise only one actuator arm and the HSA 400 has only one HGA. Understandably, the actuator arm 405 is not limited to the structure shown in FIG 5*b*, any suitable structure with a support portion for supporting the tail end 507 can be utilized in the invention. Also, the HGA is not limited to the type shown in FIG. 5*a*, any suitable type of HGA can be used in the invention if it can be swaged to the actuator arm structure.

Referring to FIG. 8, the disk drive unit 100 according to an embodiment of the present invention can be attained by assembling the housing 108, a set of disks 101 each having a surface forming concentric tracks adapted to record data magnetically, a spindle motor 102, the VCM 107, and the HSA 400 of the present invention. The disks 101 are mounted on the spindle motor 102, which causes the disks 101 to spin. Because the structure and/or assembly process of disk drive unit of the present invention are well known to persons ordinarily skilled in the art, a detailed description of such structure and assembly is omitted herefrom.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A head stack assembly, comprising:
   a voice coil;
   an E-block connected to the voice coil, comprising at least one actuator arm;
   at least one head gimbal assembly, wherein each said head gimbal assembly is swaged on a tip of the respective actuator arm and comprises a suspension having a flexure for supporting a slider thereon; and
   at least one support block formed on each said actuator arm having a supporting portion to support a tail end of the flexure so as to reduce displacement of the flexure,
   wherein the support block comprises a side support plate provided on a tip of each actuator arm, the side support plate being substantially rectangular and being located on and generally perpendicular to a side portion of the tip of the actuator arm.

2. The head stack assembly as claimed in claim 1, wherein the support block is a step support block having a top surface, a bottom surface, and a swage hole for swaging the head gimbal assembly, and
   wherein the side support plate protrudes from at least one of the top and bottom surfaces of the step support block.

3. The head stack assembly as claimed in claim 1, wherein the side support plate has a support surface to support the tail end of the flexure.

4. A disk drive unit, comprising
   a set of disks;
   a spindle motor to spin the disks;
   a head stack assembly; and
   a voice coil motor to drive the head stack assembly;
   wherein the head stack assembly comprises:
   a voice coil;
   an E-block connected to the voice coil, comprising at least one actuator arm;
   at least one head gimbal assembly, wherein each said head gimbal assembly is swaged on a tip of the respective actuator arm and comprises a suspension having a flexure for supporting a slider thereon; and
   at least one support block formed on each said actuator arm having a supporting portion to support a tail end of the flexure so as to reduce displacement of the flexure,
   wherein the support block comprises a side support plate provided on a tip of each actuator arm, the side support plate being substantially rectangular and being located on and generally perpendicular to a side portion of the tip of the actuator arm.

5. The disk drive unit as claimed in claim 4, wherein the support block is a step support block having a top surface, a bottom surface, and a swage hole for swaging the head gimbal assembly, and
   wherein the side support plate protrudes from at least one of the top and bottom surfaces of the step support block.

6. The disk drive unit as claimed in claim 4, wherein the side support plate has a support surface to support the tail end of the flexure.

7. A method of making a head stack assembly, said method comprising:
   providing a voice coil;
   providing an E-block having at least one actuator arm;
   connecting the E-block to the voice coil;
   providing at least one head gimbal assembly, each said head gimbal assembly comprising a suspension having a flexure for supporting a slider thereon;
   swaging each said head gimbal assembly on a tip of the respective actuator arm; and
   forming at least one support block on each said actuator arm in forming the E-block, each said support block having a support portion to support a tail end of the flexure so as to reduce displacement of the flexure,
   wherein the support block comprises a side support plate provided on a tip of each actuator arm, the side support plate being substantially rectangular and being located on and generally perpendicular to a side portion of the tip of the actuator arm.

8. The method as claimed in claim 7, further comprising forming a step support having a top surface, a bottom surface, and a swage hole for swaging the head gimbal assembly in the forming of the support block,
wherein said support plate protrudes from at least one of the top and bottom surfaces of the support block.

9. The method as claimed in claim 7, further comprising forming a support surface to support the tail end of the flexure in the forming of the support plate.

10. The method as claimed in claim 7, further comprising fixing the tail end of the flexure to the support portion of the support block.

* * * * *